(12) United States Patent
Degarate

(10) Patent No.: US 8,544,175 B2
(45) Date of Patent: Oct. 1, 2013

(54) METHOD OF MANUFACTURING HANDGUARDS

(76) Inventor: Paul Degarate, Niwot, CO (US)

( * ) Notice: Subject to any disclaimer, the term of this patent is extended or adjusted under 35 U.S.C. 154(b) by 958 days.

(21) Appl. No.: 12/334,531

(22) Filed: Dec. 15, 2008

(65) Prior Publication Data

US 2009/0235527 A1 Sep. 24, 2009

Related U.S. Application Data

(60) Provisional application No. 61/013,897, filed on Dec. 14, 2007, provisional application No. 61/013,637, filed on Dec. 13, 2007.

(51) Int. Cl.
*B21D 31/00* (2006.01)
*B21D 53/88* (2006.01)

(52) U.S. Cl.
USPC ............ 29/897.2; 29/34 R; 29/557; 29/558; 72/374; 74/551.8

(58) Field of Classification Search
USPC ............ 29/34 R, 557, 558, 897.2; 72/129, 72/130, 58; 74/551.1; 280/14.27, 14.28
See application file for complete search history.

(56) References Cited

U.S. PATENT DOCUMENTS

| | | | | |
|---|---|---|---|---|
| 2,357,553 A * | 9/1944 | Schwinn | ................. | 403/213 |
| 3,462,188 A * | 8/1969 | Edgar | ................. | 296/78.1 |
| 3,703,093 A * | 11/1972 | Komatsu et al. | ................. | 72/342.4 |
| 5,485,737 A * | 1/1996 | Dickerson | ................. | 72/57 |
| 6,463,779 B1 * | 10/2002 | Terziakin | ................. | 72/342.96 |
| 6,804,980 B2 * | 10/2004 | Bulle | ................. | 72/64 |
| D549,619 S * | 8/2007 | Jacobs et al. | ................. | D12/114 |
| 7,257,873 B2 * | 8/2007 | Laivins et al. | ................. | 29/412 |
| 7,429,711 B2 * | 9/2008 | Machrowicz | ................. | 219/50 |
| 2004/0217243 A1 * | 11/2004 | Laivins et al. | ................. | 248/230.1 |
| 2007/0137409 A1 * | 6/2007 | Laivins et al. | ................. | 74/551.9 |
| 2008/0264198 A1 * | 10/2008 | Laivins et al. | ................. | 74/551.8 |
| 2010/0186542 A1 * | 7/2010 | Hashimoto | ................. | 74/551.1 |
| 2010/0225083 A1 * | 9/2010 | Jung | ................. | 280/124.107 |
| 2012/0234129 A1 * | 9/2012 | Adan | ................. | 74/551.8 |

* cited by examiner

*Primary Examiner* — Alexander P Taousakis

(57) ABSTRACT

An improved method for manufacturing hand guards, utilizing this method multiple sheets can be stacked and then clamped to a XY cutting table to cut multiple patterns therein, subsequently a forming tool or die is used to form complex 3 dimensional shapes in any XY, XZ, YZ or XYZ planes in a single operation.

14 Claims, 8 Drawing Sheets

METHOD OF MANUFACTURING HANDGUARDS

RELATED APPLICATION

This is a non-provisional application of provisional patent applications Ser. No. 61/013,897, Filed on 14 Dec. 2007, titled "Improved Method for Manufacturing Handguards" and Ser. No. 61/013,637, filed on 13 Dec. 2008, titled "Amended Method of Manufacturing Handguards", and claims priority to said provisional applications, and fully incorporates theirs specification and drawings by reference.

STATEMENT REGARDING FEDERALLY SPONSORED RESEARCH OR DEVELOPMENT

Not applicable.

BACKGROUND OF THE INVENTION

The improved method of manufacturing hand guards represents the option of multiplying the rate of productivity in manufacture and a method for forming complex shapes of greater strength through a forming process, this process allows for complex shapes to be formed at once and twists to be introduced during the forming.

Prior art (Laivins et al, U.S. Pat. No. 7,257,873) shows a method of manufacturing handguard blanks of generally parallel width, cutting these blanks from a single sheet of material as defined by the use of tapered apertures, cutting this sheet of material without regard to the direction of the grain of the material and then bending around a single axis or in Z direction only.

BRIEF SUMMARY OF THE INVENTION

The object of this invention is to produce hand guards of greater quality at a higher rate of production. To accomplish this, the preferred embodiment allows for one or more sheets of extruded bar stock to be stacked in a Z direction, one or more of these stacks are arranged on a tooling plate in a XY plane. In this XY plane a desired handguard pattern is applied to the stacks creating many handguard blanks at once and defined, by virtue of the extrusion, the direction of the grain of the material, thereby dictating the optimum strength of the material by creating the long axis of the blanks parallel to the grain of the material.

The handguard patterns may include a hole, holes, threaded holes, slots, cutouts, pockets, bosses, or any desired combination of features, including the introduction of varying widths of the blanks to correspond to areas of desired higher strength. Then the cutting of this pattern is performed. This cutting may be accomplished by a variety of methods including but not limited to CNC machining, laser cutting and water jetting. Once the cutting is completed, the hand guard blank is placed into a forming die. Sufficient force is applied to the die to form the desired 3 dimensional shapes. During this forming if enough force is applied quickly enough the surfaces of the material will be compressed to a higher density creating a part of higher strength and hardness.

DETAILED DESCRIPTION OF THE INVENTION

The improved method of manufacturing hand guards incorporates the design of the pattern to add strength to the handguard blank by paying attention to the grain structure of the material, adding material in the areas where forming is substantial and in areas where the handguards will see impacts while in use that would otherwise be vulnerable to deformation. The blank is then placed in a forming tool to form complex shapes, including but not limited to, concavities and twists in a single operation.

Figure 1:
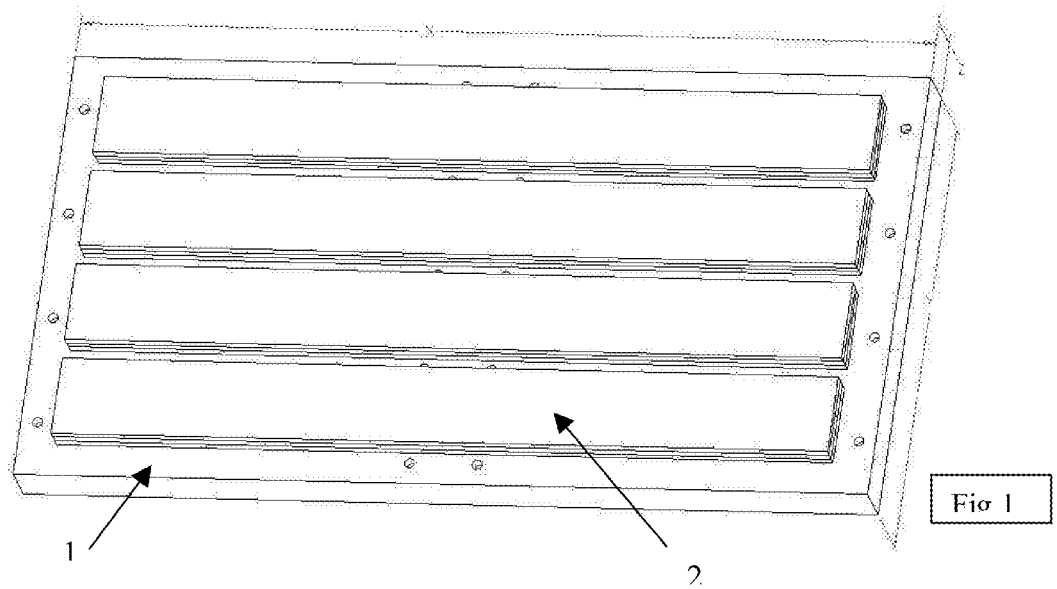
FIGS. 1 and 2 show a tooling plate with the bar stock being stacked and then being clamped (clamp bolts not shown) to the tooling plate.
Figure 2:
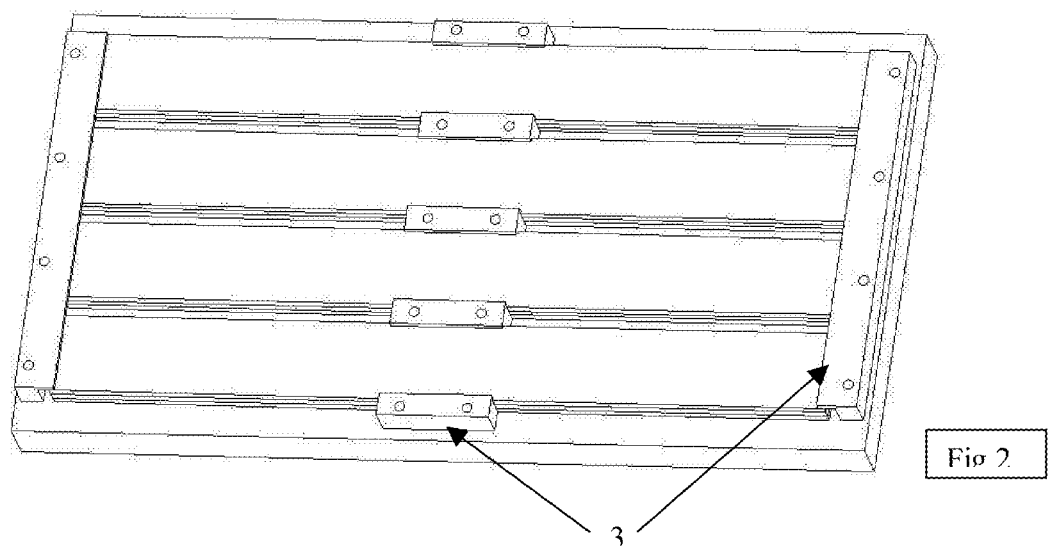

In FIG. 1, a tooling plate 1 is attached to the table of a CNC machine (not shown), then one or more pieces of material 2 are stacked upon it and clamped to it using clamps 3 in FIG. 2, the material 2 to be used in the preferred embodiment is an extruded aluminum alloy bar stock, approx ⅜" thick×4" wide cut into 3' lengths, by using this bar stock the orientation of the grain is defined and easily identified, whereas in using sheet stock, the grain orientation is not always easily discernable. This eliminates any possible mistake in producing blanks cut across the grain, resulting in a handguard of greatly reduced strength. This method represents an improvement from prior art in that the handguard blank of the present invention can be produced at a higher rate and quality.

Figure 3:
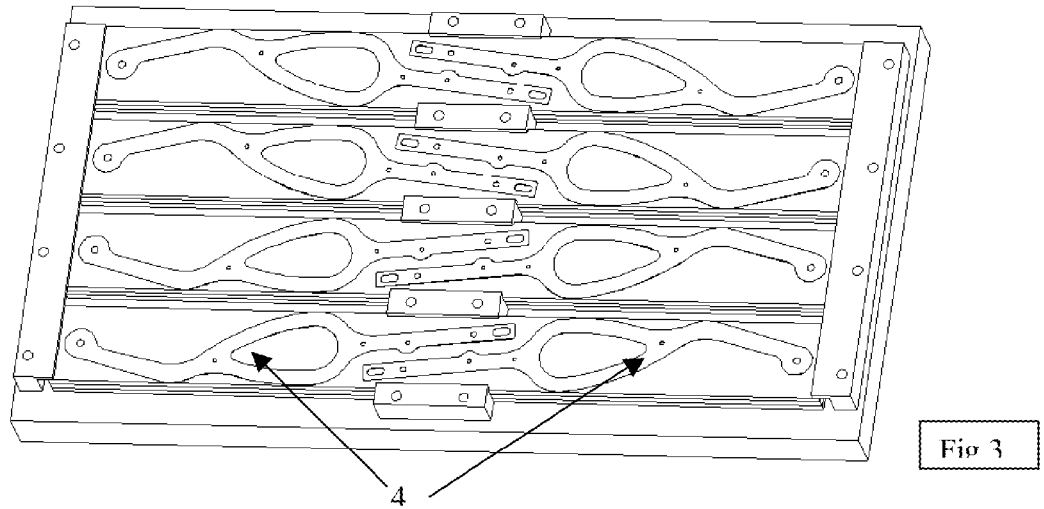
FIGS. 3 and 4 show a virtual pattern being applied. Holes that are to be used to aid in fastening the blanks to the tooling plate are cut first (fasteners not shown).

To create a blank of higher strength a pattern may include a hole, holes, threaded holes, slots, cutouts, pockets, bosses, or any desired features, subsequent to the determination of the pattern, typically by use of computer aided design, a virtual pattern 4 is applied to the stock FIG. 3, the features of the pattern are produced in the material by means of cutting. This cutting may be accomplished by CNC machining, utilizing various drills end mills and other cutters.

Figure 4:
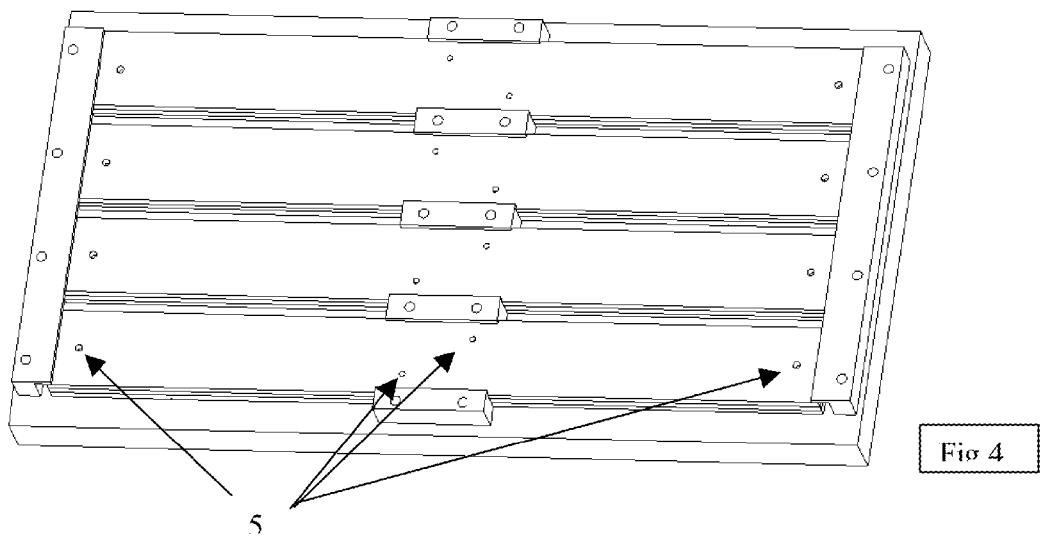

In FIG. 4, a series of holes 5 are drilled first that are used to better attach the stock to the tooling plate. Fasteners (not shown) are then applied and cutting of the features of the pattern can be performed.

Figure 5:
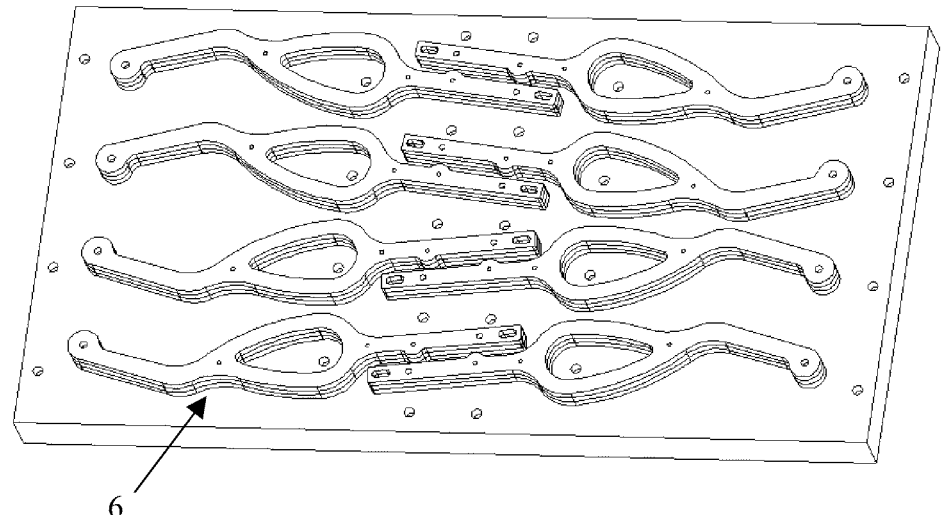
FIGS. 5 and 6 show the blanks after the cutting has been accomplished with the remainder of the material and the clamps removed.
Figure 6:
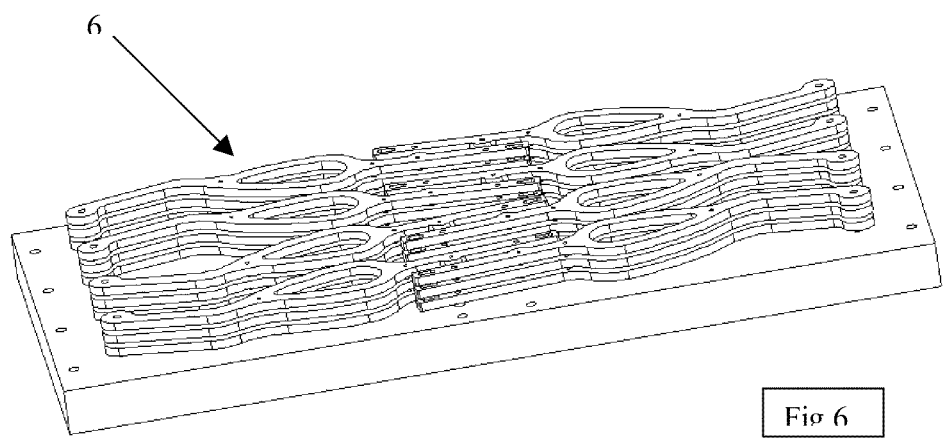

Once the cutting of the blank is satisfied FIG. 5, the handguard blank 6 is unfastened from the tooling plate FIG. 6, then any secondary operations can de performed, such as deburring or tumbling (not shown).

Figure 14:
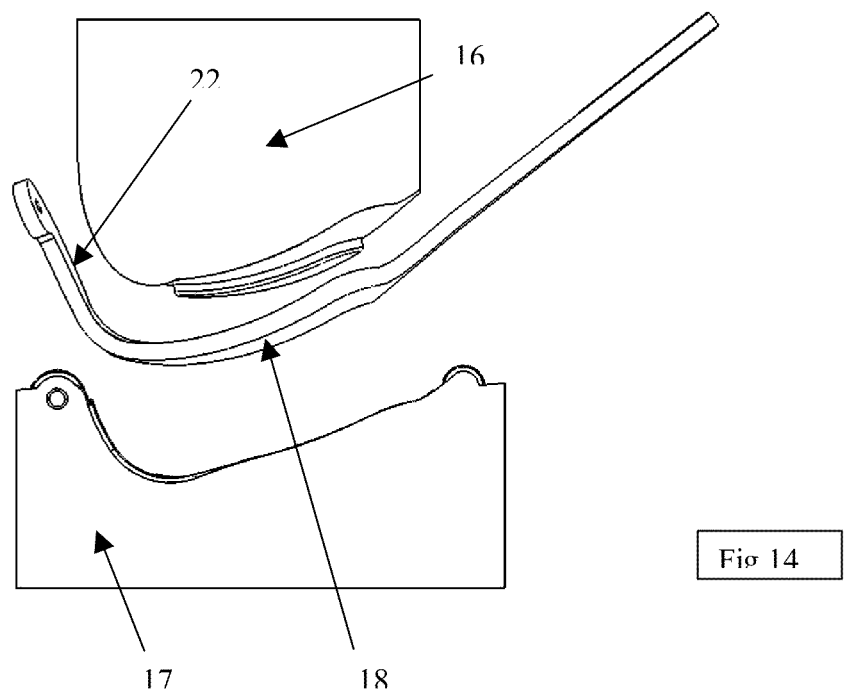
FIGS. 14-16 show the forming die and the subsequent formed blank.

The handguard blank is then placed into a forming die, this differs from prior art in that the handguard of the present invention can be formed around multiple axis in a single operation and represents an improvement in the rate, consistency and quality of the process. FIG. 14. The lower cavity side 17 being fixed to the lower platen of a press (not shown), the upper core side 16 being attached to the upper platen of a press (not shown), then sufficient force is applied to the die to form the desired 3 dimensional shape 18 and 22.

It should also be noted that during this forming if enough force is applied quickly enough the surfaces of the material will be compressed to a higher density creating a part of higher strength, stiffness and hardness.

Figure 15:
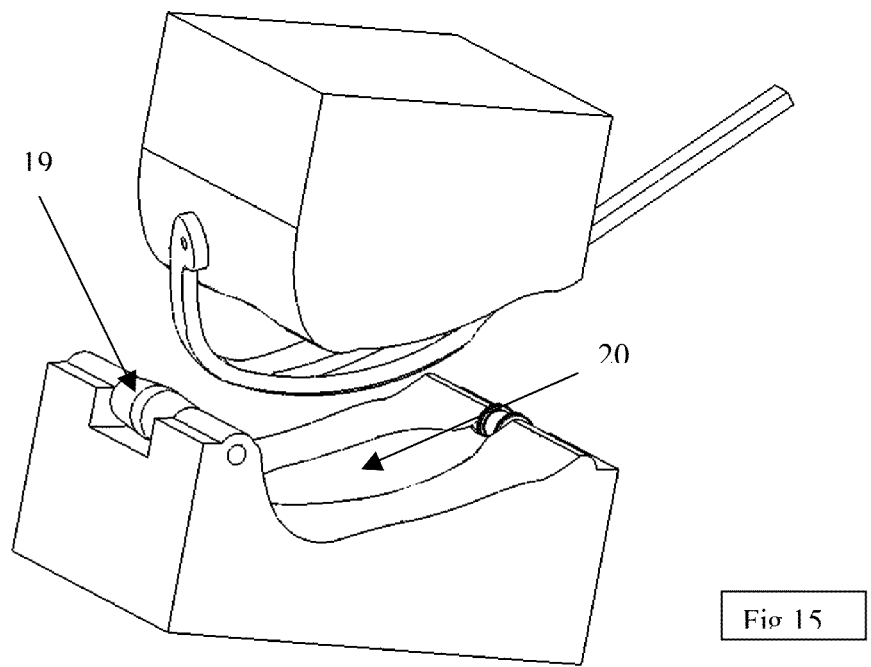
Figure 16:
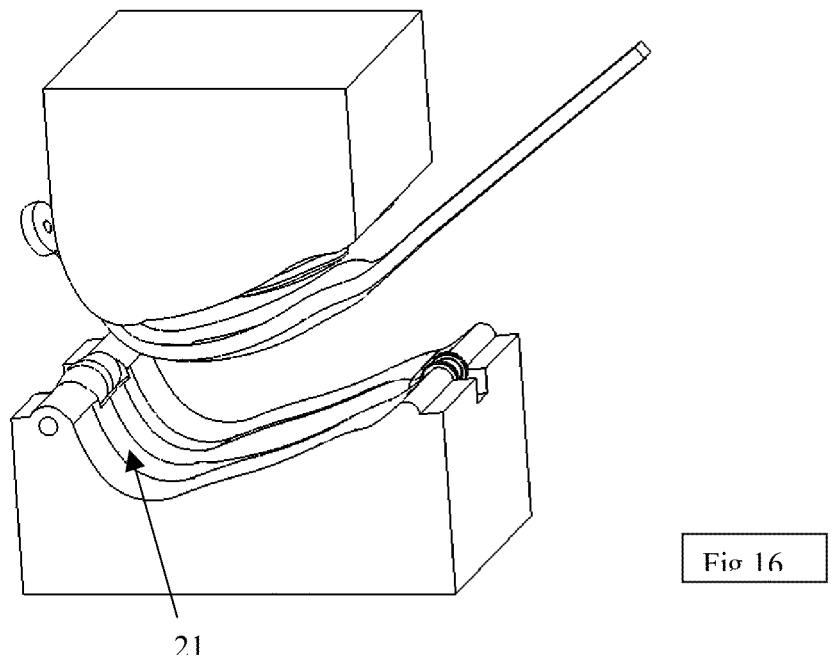
Figure 17:
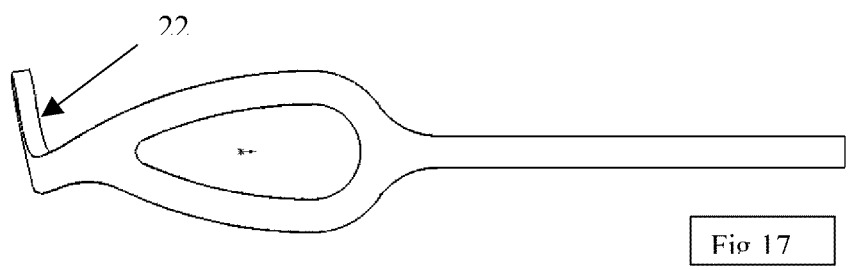
FIGS. 17-19 show the complex concavity and the twist created by the forming die.
Figure 18:
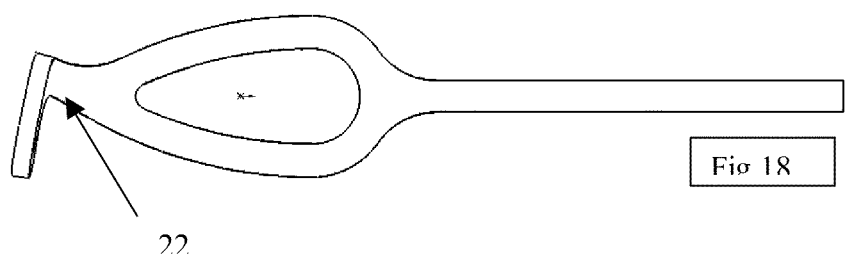
Figure 19:
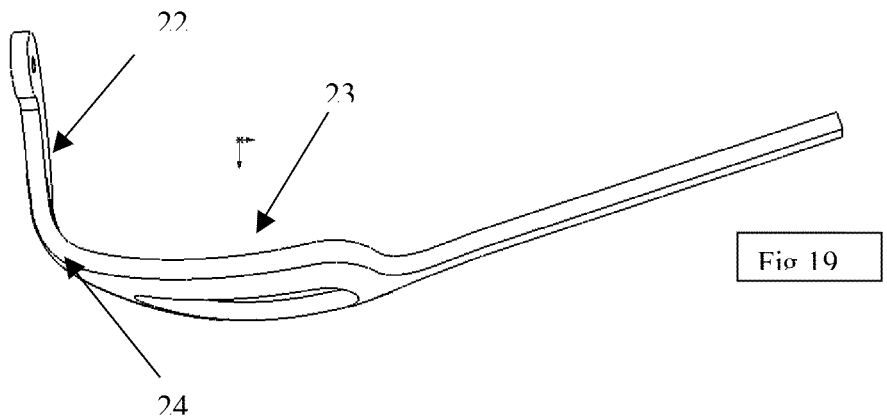

The details in FIG. 15 show the lower cavity side of the die including the area of concavity 20 that forms the concavity in the handguard and a tapered roller 19 that corresponds with an angled area in the die 21 of FIG. 16 that aids in the forming of the twist 22 in the handguard.

Figure 20:
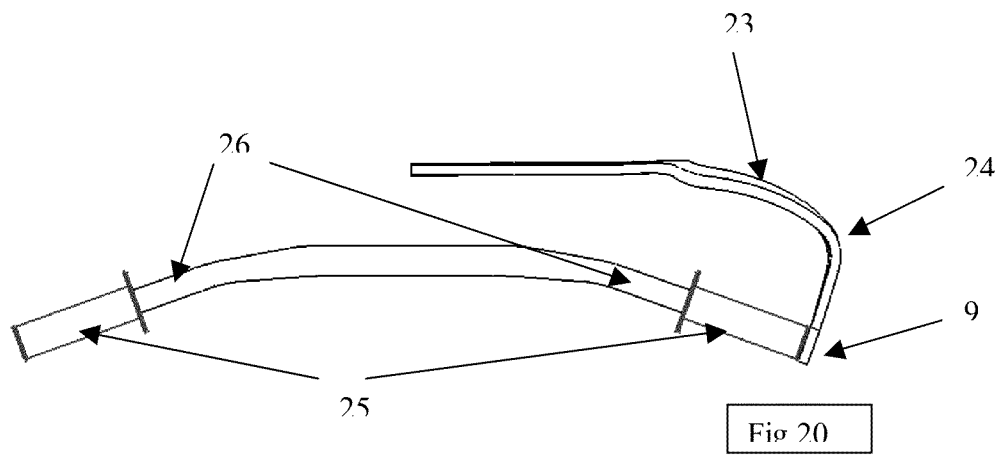
FIGS. 20 and 21 show the formed handguard blank attached to a pair of handlebars, the form fitting of the concavity in the area of the handgrip, a bar end boss which serves as a grip protector and the geometry of the handlebars that dictates a necessity for the twist.
Figure 21:
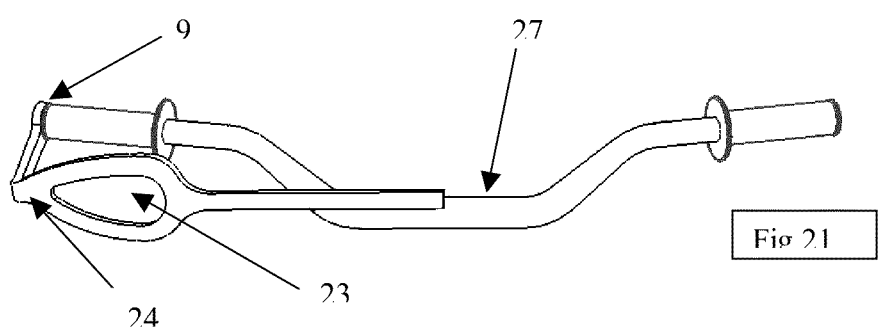

Prior art does not address the necessity of a twist 22. In FIGS. 20-21 we have a handlebar 27 which defines an axis, with bends 26 which are the rise and pullback of the bars. The handlebar grips 25 define yet another axis, which is skewed from the axis defined by 27. Adding a twist allows for a better fit of the handguard bar end boss 9 to be perpendicular to the axis defined by the handlebar grips 25 without adjustment by the end user.

Figure 7:
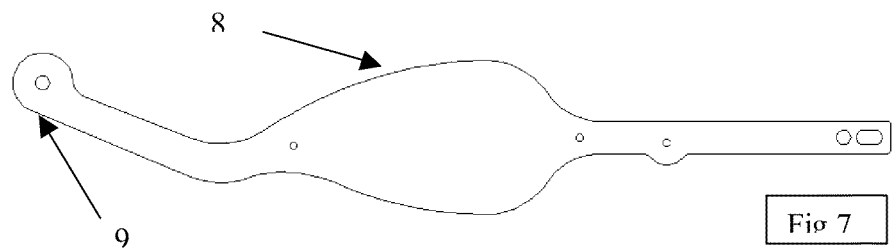
FIGS. 7-13 show examples of pattern designs, showing the areas of greater widths, bosses, pockets, cutouts, holes, etc.

To create a blank of higher strength the pattern contains features that are not addressed in prior art. In FIGS. 7-13 examples of the patterns are shown, FIG. 7 shows a blank that has an area of significantly greater width 8, that when formed into a concavity, provides greater protection in the handlebar grip area, and a bar end boss 9 that protects the grips of the handlebar.

Figure 8:
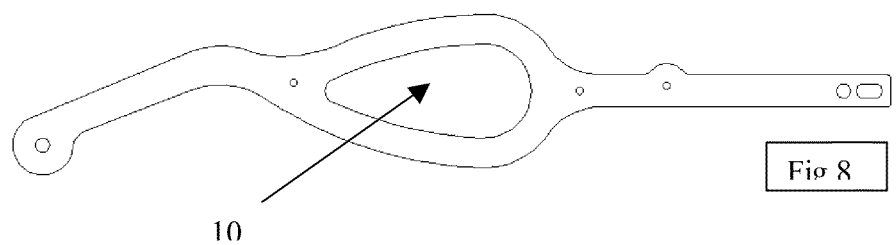

FIG. 8 shows the handguard blank pattern with a cutout 10.

Figure 9:
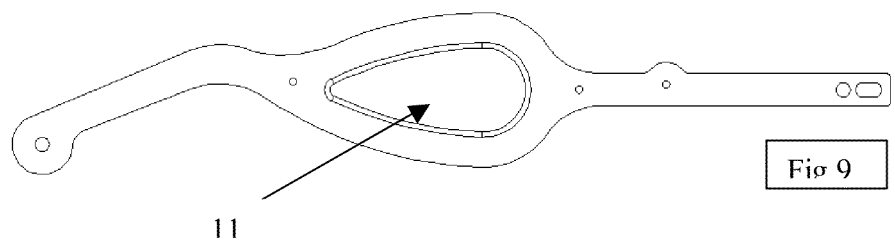

FIG. 9 shows the handguard blank pattern with a pocket 11.

Figure 10:
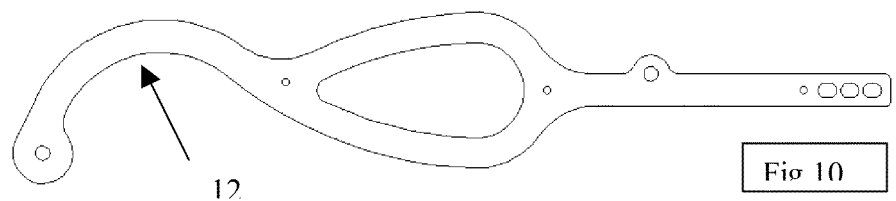

FIG. 10 shows the handguard blank pattern with a large radius 12.

Figure 11:
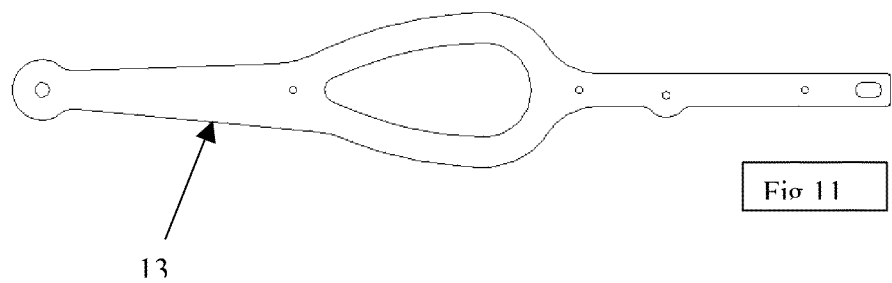

FIG. 11 shows the handguard blank pattern with an area of greater width 11, that when formed into a concavity, provides greater strength in the area of most common impacts.

Figure 12:
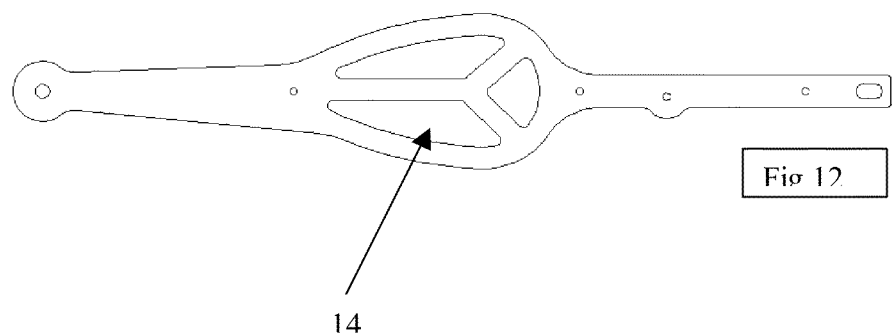

FIG. 12 shows the handguard blank pattern with multiple cutouts in the area of greater width 14 that when formed into a concavity, provides greater impact strength.

Figure 13:
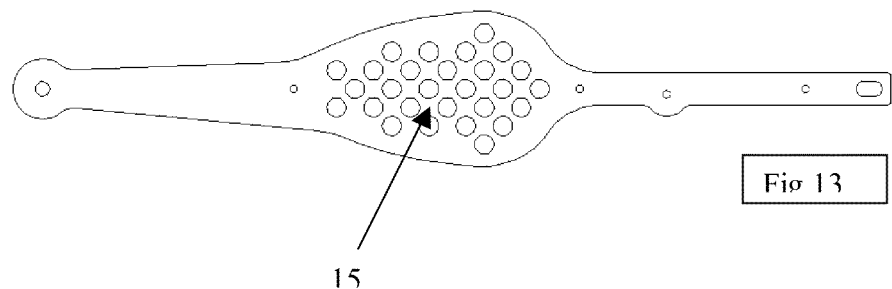

FIG. 13 shows the handguard blank pattern with multiple holes in the area of greater width 15.

The present inventions use of the design of the pattern represents an improvement in the strength and protection from prior art.

While the invention has been described with reference to preferred embodiments, those skilled in the art will understand that various changes may be made and equivalents may be substituted for elements thereof without departing from the scope of the invention. It is intended that the invention not be limited to the particular embodiment disclosed as the best mode contemplated for carrying out this invention, but that the invention will include embodiments falling within the scope of the claims.

What is claimed is:

1. A method of manufacturing a hand guard comprising,
   (a) a piece of material placed with surfaces parallel to an XY plane and extending in a Z direction,
   (b) a pattern applied to said XY surface, wherein the pattern contains at least one area of substantially greater cross sectional width,
   (c) cutting along said pattern and through said thickness to create a handguard blanks,
   (d) using a form tool, forming said handguard blank 3 dimensionally to form more than one bend simultaneously.

2. The method of claim 1, wherein the handguard blank is formed into at least one area of 3 dimensional concavity.

3. The method of claim 1, wherein the handguard blank contains a twist after forming.

4. The method of claim 1, wherein there are multiple patterns.

5. The method of claim 4, wherein the multiple patterns are nested.

6. A method of manufacturing a hand guard comprising,
   (a) more then one piece of material placed with surfaces parallel to an XY plane and extending in a Z direction,
   (b) a pattern applied to said XY surface, wherein the pattern contains an area of substantially greater cross sectional width,
   (c) cutting along said pattern and through said thicknesses to create handguard blanks,
   (d) using a form tool, forming said handguard blank 3 dimensionally to form more than one bend simultaneously.

7. The method of claim 6, wherein the handguard blank is formed into at least one area of 3 dimensional concavity.

8. The method of claim 6, wherein the handguard blank contains a twist after forming.

9. The method of claim 6, wherein there are multiple patterns.

10. The method of claim 9, wherein the multiple patterns are nested.

11. A method of manufacturing a hand guard comprising,
    (a) a piece of material placed with surfaces parallel to an XY plane and extending in a Z direction,
    (b) a pattern applied to said XY surface, wherein the pattern contains an area of substantially greater cross sectional width,
    (c) said handguard pattern whose material grain orientation is parallel with the long axis of said pattern,
    (d) cutting along said pattern and through said thickness to create a handguard blank,
    (e) using a form tool, forming said handguard blank by bending said handguard blank 3 dimensionally.

12. The method of claim 11, wherein the handguard blank is formed into at least one area of 3 dimensional concavity.

13. The method of claim 11, wherein more then one piece of material is placed with surfaces parallel to an XY plane and extending in the Z direction.

14. The method of claim 11, wherein the handguard blank contains a twist after forming.

* * * * *